United States Patent [19]

Azagury et al.

[11] Patent Number: 6,148,309
[45] Date of Patent: Nov. 14, 2000

[54] METHOD FOR HANDLING OVERFLOW OF COUNTERS IN COMPARISON BASED ACTIONS

[75] Inventors: Alain Azagury, Nesher; Elliot K. Kolodner, Haifa; Erez Petrank, Haifa; Zvi Yehudai, Haifa, all of Israel

[73] Assignee: International Business Machines Corporation, Armonk, N.Y.

[21] Appl. No.: 09/139,753

[22] Filed: Aug. 25, 1998

[51] Int. Cl.[7] .................................................. G06F 17/30
[52] U.S. Cl. ............................................................ 707/206
[58] Field of Search .................................... 707/200, 206, 707/318

[56] References Cited

U.S. PATENT DOCUMENTS

| | | | |
|---|---|---|---|
| 5,903,900 | 5/1999 | Knippel et al. | 707/206 |
| 6,038,572 | 3/2000 | Schwartz et al. | 707/206 |

OTHER PUBLICATIONS

Hudson et al., "A Language–Independent Garbage Collector Toolkit," COINS Technical Report 91–47, Sep. 1991.

Holzle, U., "A Fast Write Barrier for Generational $Gar_{bag}e$ Collectors," OOPSLA/ECOOP '93, Workshop on Garbage Collections in Object–Oriented Systems, Oct. 1993.

Hosking, A.L., et al., "Remembered Sets Can Also Play Cards," OOPSLA '93, Workshop on Garbage Collection and Memory Management, Washington D.C., Sep. 1993.

Hudson, R.L., et al., "Incremental Collection of Mature Objects," Proceedings on International Workshop on Memory Management, vol. 637 of Lecture Notes in Computer Science, Springer–Verlag, 1992.

Lieberman, H., et al., "A Real–Time Garbage Collector Based on the Lifetimes of Objects," Communications of the ACM, 26–6:419–429 (1983).

Seligmann, J., et al., "Incremental Mature Garbage Collection Using the Train Algorithm," Proceedings of 1995 European Conference on Object–Oriented Programming, Lecture Notes in Computer–Science, Springer–Verlag AUg. 1995.

Sobalvarro, P.G., "A Lifetime–based Garbage Collector for LISP Systems on General–Purpose Computers," Technical Report AITR–1417, MIT, AI Lab, Feb. 1988.

Wilson, P.R., "Uniprocessor Garbage Collection Techniques," Proceedings of International Workshop on Memory Management, vol. 637 of Lecture Notes in Computer Science, Springer–Verlag, 1992.

Wilson, P.R., "A 'Card–Marking' Scheme for Controlling Integenerational References in Generation–Based Garbage Collection on Stock Hardware," ACM SIGPLAN Notices, 24–5:87–92 (1989).

R.E. Jones and R.D. Lins. Garbage Collection: Alogorithms for Automatic Dynamic Memory Management. Chapter 7 John Wiley & Sons (1996).

*Primary Examiner*—Paul V. Kulik
*Attorney, Agent, or Firm*—Browdy and Neimark

[57] ABSTRACT

In a computer application having a counter for setting first and second counter values in respect of first and second objects. The counter has a range of n possible values and being incremented or decremented in accordance with update criterion. The application taking an action according to whether the first counter value is larger or equal to the second counter value. A method for handling a courter overflow event whereby the counter is incremented beyond said range by executing the steps of: compacting the first and second counter values to m values (m<n) so as to constitute first and second compacted counter values, such that if the first counter value id larger than or equal to the second counter value then the compacted first value is not smaller than the compacted second value, and setting the counter to a value from among n–m values within the specified range.

8 Claims, 3 Drawing Sheets

METHOD FOR HANDLING OVERFLOW OF COUNTERS IN COMPARISON BASED ACTIONS

FIELD OF THE INVENTION

The present invention s in the general field of overflow handling in computer applications.

I. LIST OF PRIOR ART

In the description below, reference is occasionally made to the following publications:

[1] R. E. Jones and R. D. Lins. Garbage Collection: Algorithms for Automatic Dynamic Memory Management. John Wiley & Sons, July 1996.

[2] U. Hölzle. A fast write barrier for generational garbage collectors. In Eliot Moss, Paul R. Wilson, and Benjamin Zorn, editors. OOPSLA/ECOOP '93 Workshop on Garbage Collections in Object-Oriented Systems, October 1993

[3] A. L. Hosking and R. L. Hudson Remembered Sets Can Also Play Cards. In OOPSLA'93 Workshop on Garbage Collection and Memory Management. Washington, D.C., September 1993.

[4] R. L. Hudson and J. E. B. Moss. Incremental garbage collection for mature objects. In Yves Beakers and Jacques Cohen, editors. Proceedings of International Workshop on Memory Management, volume 637 of Lecture Notes in Computer Science, 1992. Springer-Verlag.

[5] H. Lieberman and C. E. Hewitt. A Real Time Garbage Collector Based on the Lifetimes of objects. Communications of the ACM, 26(6), pages 419–429, 1983.

[6] J. Seligmann and S. Grarup. Incremental mature garbage collection using the train algorithm. In O. Nierstras, editor. Proceedings of 1995 European Conference on Object-Oriented Programrming, Lecture Notes in Computer Science. Springer-Verlag, August 1995.

[7] Patrick Sobalvarro. A lifetime-based garbage collector for Lisp systems on general-purpose computers. Technical Report AITR-1417, MIT, AI Lab, February 1988.

[8] D. Ungar. Generation Scavenging: A Non-disruptive High Performance Storage Reclamation Algorithm. Proceedings of the ACM Symposium on Practical Software Development Environments, ACM SIGPLAN Notices Vol. 19, No. 5, May 1984, pp. 157–167.

[9] Paul R Wilson. Uniprocessor garbage collection techniques. In Yves Bekkers and Jacques Cohen, editors. Proceedings of International Workshop on Memory Management, volume 637 of Lecture Notes in Computer Science, 1992. Springer-Verlag.

[10] P. R Wilson and T. G. Moher. A card-making scheme for controlling intergenerational references in generation-based garbage collection on stock hardware. ACM SIGPLAN Notices, 24(5):87–92, 1989.

BACKGROUND OF THE INVENTION

In many computer applications, variables e.g. counters are used to signify various states of the application. Consider, for example, a one-byte-long counter (ranging over the values 0–255) that stands for a time stamp assigned to objects in a computer application. The counter is initialized to the value 0 and during normal course of operation of the application, the value of the time stamp is assigned to various objects and then the counter is incremented all as stipulated by the application.

When the counter value equals 255 and is then subject to increment, an overflow event occurs since, obviously, the value 256 cannot be represented in an 8-bit-long counter. A naive approach to handle the overflow event is to extend the counter to, say, two bytes, and thereby extending the range of values up to 65535. This naive solution not only complicates the application (as it m.ay be in some processing machines more time consuming to handle a two-byte-long counter than a one-byte-long counter), but also postpones rather than solves the problem. Thus, the counter will eventually be set to 65335 and in the next increment an overflow event occurs.

It is also impossible to simply reset the counter and to start the counting all over again, since the values 0–255 (or at least some of them) have already been used previously. Thus, for example, in the case of a time stamp, the same value x cannot be used to signify a first time (obtained in the first round of counting) and a second, later, time (obtained In the second round of counting).

The present invention concerns an overflow event in applications where a counter sets first and second counter values to respective first and second objects In the application program. A given action should be taken when the first counter values are larger than or equal to the second counter values. One out of any variants where this condition is encountered is in an application for garbage collection of memory objects that reside in a so called old area of a memory heap (herein garbage collection application). The specified technique is disclosed in a co-pending U.S. patent application Ser. No. 09/139,754 assigned to the present applicant and filed simultaneously to the present application. The contents of U.S. patent application Ser. No. 09/139,754 are incorporated herein by reference.

Without going into unnecessary details, in the specified garbage collection application a counter (8-bit-long) that signifies a garbage collection cycle is initialized to 0 or 1 and is than incremented after each cycle. A first counter value of the counter (i.e. garbage collection cycle) is set to a first object (designated as cards) when a first condition is met, and a second counter value is set to a second object (designated as cars) when a second condition is met.

A certain action (in this specific example the action being "perform a given update in a certain data structure") is applied to the second objects in respect of all first objects having associated therewith a cycle value larger than the cycle value of the first object.

The dilemma discussed above is encountered in the case of overflow i.e. the counter has the value of 255 and should be incremented. Put differently, all 255 values are used by either cards and/or cars, and there are no more free values for future use. The above mentioned naive solutions are, obviously, unsatisfactory.

There is, accordingly, a need in the art to provide a satisfactory solution for handling overflow events in applications of the kind discussed above.

SUMMARY OF THE INVENTION

According to the invention, there is provided in a computer application having a counter for setting first and second counter values in respect of first and second objects respectively, said counter having a range of n possible values and being incremented or decremented in accordance with update criterion, said application taking an action according to a decision criterion that includes the stipulation that the first counter value is larger or equal to the second counter value;

a method for handling a counter overflow event whereby the counter is incremented beyond said range, the method comprising the steps of:
  (i) compacting the first and second counter values to m values (m<n) so as to constitute first and second compacted counter values respectively; such that if the first counter value is larger than or equal to the second counter value then the compacted first value is not smaller than the compacted second value; and
  (ii) setting the counter to a value from among n−m values within said range, whereby substantially n−m counter values are released.

The invention further provides for a computer system comprising a processor and an application executed in said processor; the application having a counter for setting first and second counter values in respect of first and second objects, respectively, said counter having a range of n possible values and being incremented or decremented in accordance with update criterion,
  said application taking an action according to a decision criterion that includes the stipulation that the first counter value is larger or equal to the second counter value;
  the processor is capable of handling a counter overflow event whereby the counter is incremented beyond said range; said processor includes:
    (i) compactor, compacting the first and second counter values to m values (m<n) so as to constitute first and second compacted counter values respectively; such that if the first counter value is larger than or equal to the second counter value then the compacted first value is not smaller than the compacted second value; and
    (ii) counter setting unit, setting the counter to a value to a value from among n−m values within said range, whereby substantially n−m counter values are released.

BRIEF DESCRIPTION OF THE DRAWINGS

The invention will now be described, by way of non-limiting example only, with reference to the accompanying drawings, in which.

DETAILED DESCRIPTION OF SPECIFIC EMBODIMENTS

Figure 1:
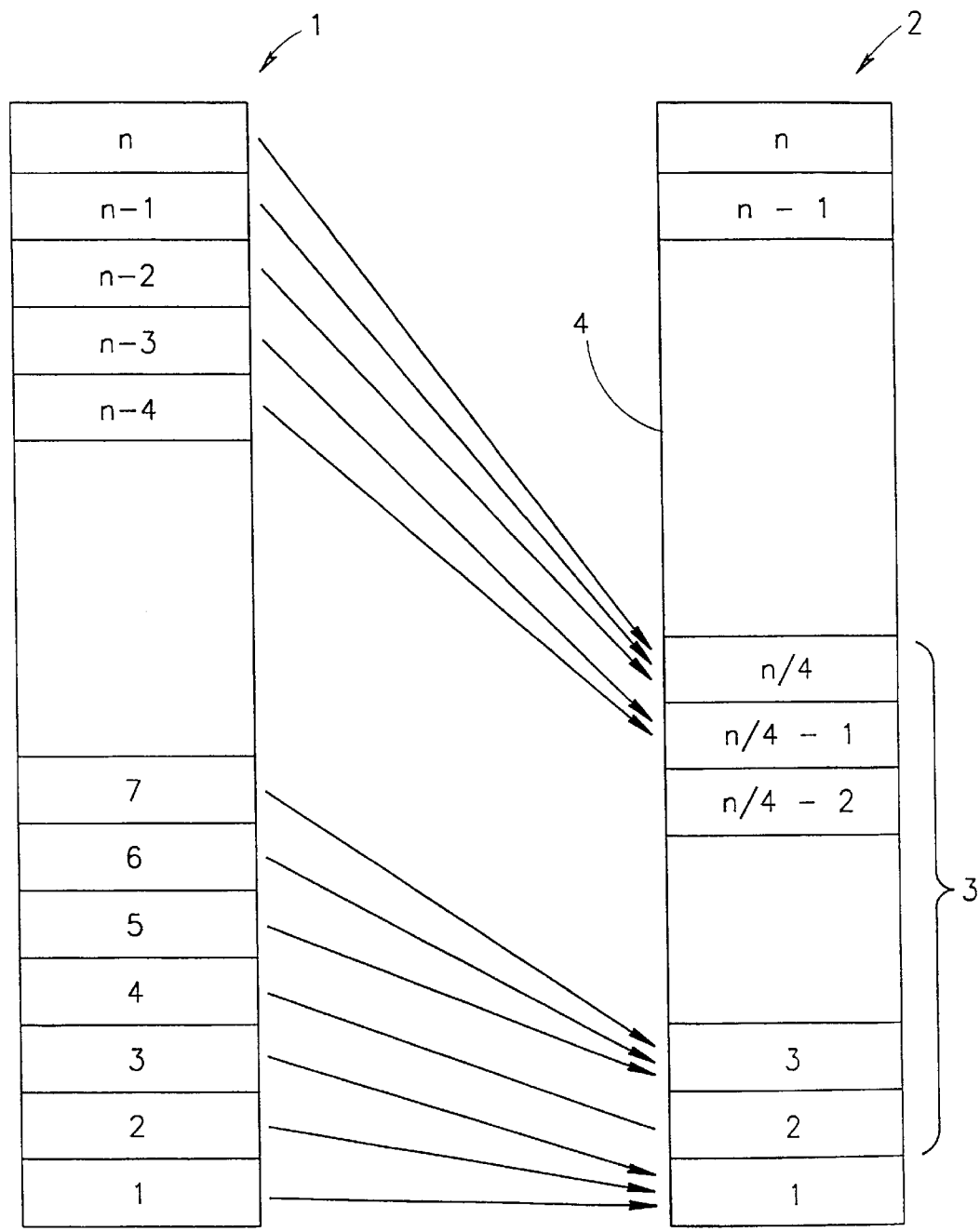
FIG. 1 illustrated a compacting step according to one embodiment of the invention.

The description below refers to a specific example of a garbage collection process. The specified process is disclosed in the specified co-pending U.S. Patent Application.

For convenience of description there follows a brief description of the garbage collection process for old area of the memory heap. The invention is by no means bound by this specific example.

In connection with garbage collection, Hudson and Moss [4] suggested a so-called train algorithm. The train algorithm partitions the so-called old area of the memory heap into parts called cars, and collects, during garbage collection, one car at time. Old area signifies area that is not frequently subject to allocations and release of memory objects and therefore does not necessitate frequent garbage collection. This notwithstanding, when garbage collection is required it normally takes a while due to the relatively large size of the old area.

Motivations, details and an implementation of the train algorithm are to be found in the prior art literature [4,6]. Only those details of the algorithm that are relevant for the present application are discussed.

In the train algorithm, trains are numbered, cars and numbered, and the lowest car in the lowest train is chosen for garbage collection. During this collection, objects are moved out of the car into other trains or the same train. Sometimes the objects are moved into existing cars and sometimes new cars are created to store them. These new cars may reside in an existing train or a new train may be created for them. After all live objects are moved from the car being collected, the car is reclaimed for future applications.

Each car has a so-called remembered set so that when a car is collected, incoming pointers (i.e. pointers that point from other cars in the old area to the collected car) may be located efficiently. This remembered set is used to keep track of the specified pointers that go from other cars into this car.

In order to keep the overhead during normal operation low, it has been proposed to combine card marking with the remembered sets method as suggested in [3], [4]. The old heap is partitioned into cards and when the application modifies a card, it marks the card dirty. When a car has to be scanned, all dirty cards are scanned and the remembered set is updated and later used to find roots for the collection.

By using this approach a dilemma of updating the remembered sets arises. Thus, there are only few remembered sets that are relevant to the current garbage collection cycle, and it is desired to avoid updating all the remembered sets considering that there are, as a rule, many of them (as many as the number of cars that are spread over the old generation). It is therefore desired to keep track of which cards should be scanned for which car collection. Otherwise, the cards are rescanned again and again.

In order to cope with this problem it has been proposed to keep for each card a card time stamp signifying the last time (i.e. garbage collection cycle) that this card was modified. For each car, there is Kept, as a car time stamp, the last time its remembered set was updated. Initially, this is the creation time of the car, but it may be later updated during a collection of another car in the same train. It is the application's responsibility to update the card table and it is the collector's responsibility to update the time stamp of the remembered set for each car.

During a collection of a car, the collector notes the time-stamp of the car, and then scans all cards that have a later i.e. newer or equal modification time-stamp. When collecting the new generation, the collector scans only cards that have been modified in the last collection cycle.

The relevant details of the train algorithm that pertain to the present invention concern cars and cards that are associated with time stamps and for which certain action is performed for all cards having time stamp value larger or equal to the time stamp of a collected car. In other words, in this specific example, the first objects are the cards; the card time stamps associated therewith correspond to said first counter values. Likewise, the cars and their associated car time stamps correspond to the second objects and their associated second counter values. The counter is set at a value indicative of the garbage collection cycle. The action that has to be taken corresponds to the update of a remembered set of a given car for all cars having a card time stamp equal to or larger than the car time stamp of the given car. The question that arises is how to handle overflow in the counter when the latter is set to 255 and is subject to increment, considering that all or most of the values 0–255 are already assigned to card and/or car time stamps.

It should be noted that whilst in the latter example the first and second objects refer to different types of objects (i.e. cars and cards), this is not necessarily always the case. According to another example the first and second objects may refer to the same type (say comparison between cars). Likewise, a given memory object may constitute in one comparison a first object and in another comparison a second object, all as required and appropriate, depending upon the particular application.

Having briefly described the garbage collection application there follows a description of the overflow handling according to the invention.

Thus, according to one example (see FIG. 1), the current information is compacted to, say, 64 values, and consequently the other 192 values are released for the next collection cycles. This can be easily augmented to any other fraction of the possible values.

In other words, all existing time stamps are divided by 4 and than the (ceiling) integer value of the division is calculated. The division is applied to the time-stamps of the cards, the time-stamps of the cars and the collection counter.

As can be seen in FIG. 1, the time stamp values before compaction (1) are compacted to (2), where, as can be seen, all values are grouped in section (3), thus leaving free space in (4). The counter is set now to the value 65 (i.e. a value selected from the free range 65–255).

This compaction is fine since it preserves the relevant properties of the relations between the time stamps in the system. A card should be scanned for a car if the time-stamp of the card is larger than or equal to the time-stamp on the car. Any card that would have been scanned for a car before the division will be scanned for the car after the division. Put differently, if a first time stamp is larger or equal to a second time stamp, then the first compacted time stamp is not smaller than the second compacted time stamp. More generally, stipulation that is met before the compaction (i.e. the cards that should be scanned for a given car) is also met after the compaction (i.e. the same cards will be scanned after the compaction).

The penalty that is paid, by following the proposed approach is that also some more cards are scanned. Consider, for example, a card and a car having time stamp values 7, 8 respectively (before the compaction) and 2,2 respectively (after the compaction). Thus, whereas before the compaction, the action is not taken (since 7<8), after the compaction the action is, unnecessarily taken (2=2). This loss of accuracy in the information is inevitable, but note that the loss is proportional to the number of possible values (256 in case one byte is used for the time stamp).

This loss of information should have little effect when the time stamp is kept in a full byte.

Figure 2:
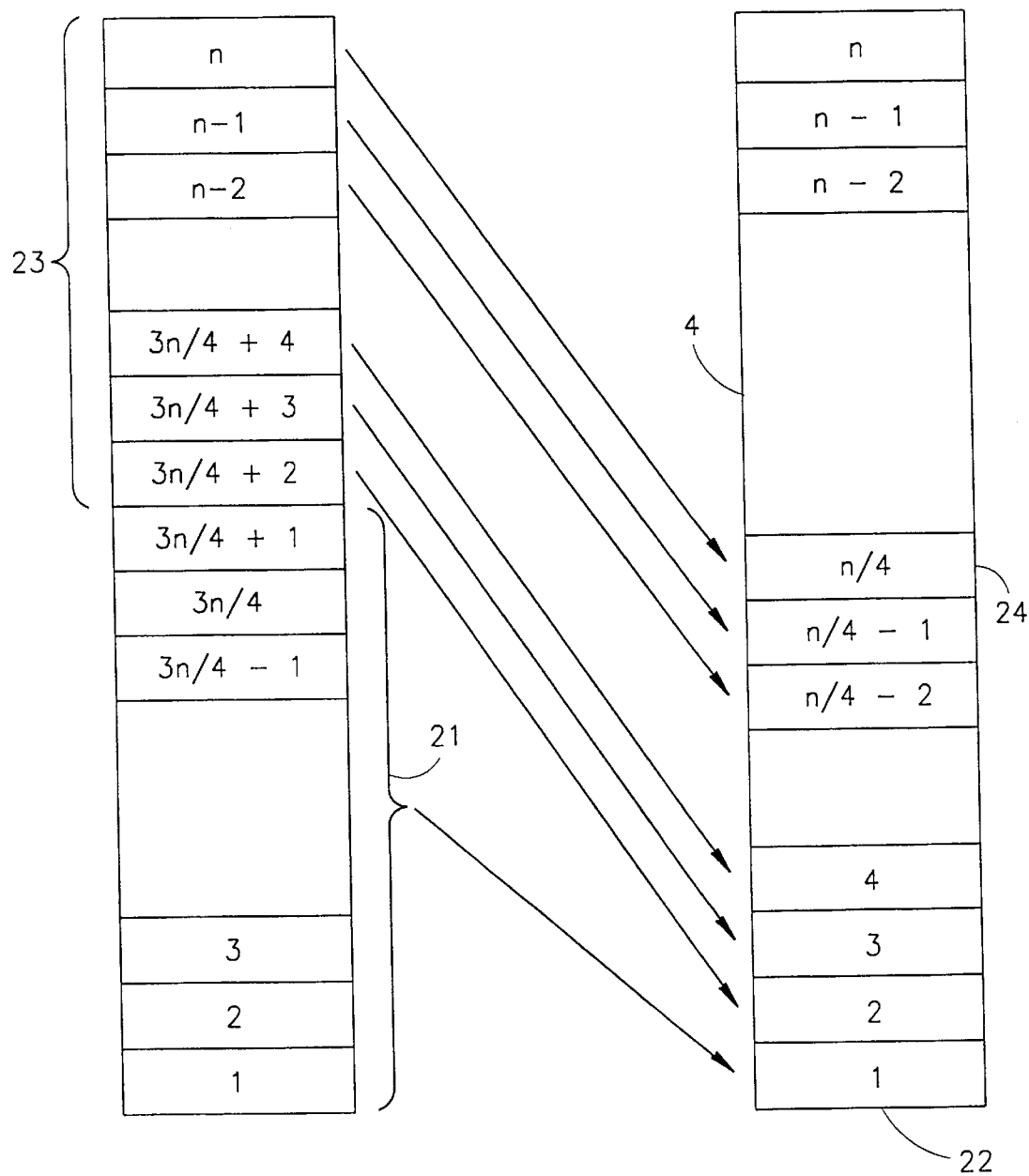
FIG. 2 illustrates a compacting step according to another embodiment of the invention.

Another example (see FIG. 2) applies, preferably, when most of the times recorded are recent times and only few cards/cars or even none at all have old time stamps. In this case, it is better to keep records for recent time and lose accuracy for older times. Accordingly, at overflow time, all times lower than e.g. 193 (21) are set to the value 1 (22), whereas 192 is subtracted from all times higher than 192 (23 and 24). (192 is chosen since it is desired to free 75% of the 256 possible values). Thus, relations between cars and cards with recorded times over 192 are fully kept. All cars with lower update time must engage in scanning all cards for collection. This is only good if the number of such cars is small, and infrequent long collections are allowed.

Other transformations are, of course applicable depending upon the specific application. The important property of any such a transformation is that it should be monotone, so that the relations between the cars and the cards are kept.

In all the proposed schemes the stipulations that are met n respect of counter values of the first and second objects (i.e. in this example to scan cards having a larger time stamp than the time stamp of a car), are also met in respect of the corresponding compacted counter values of said first and second objects (i.e. the same cards that had to be scanned before the compaction, will also be scanned after the compaction).

As explained above, the proposed technique of the invention imposes some kind of overhead in the sense that cards that would otherwise not have been scanned, will nevertheless be scanned after the compaction.

Figure 3:
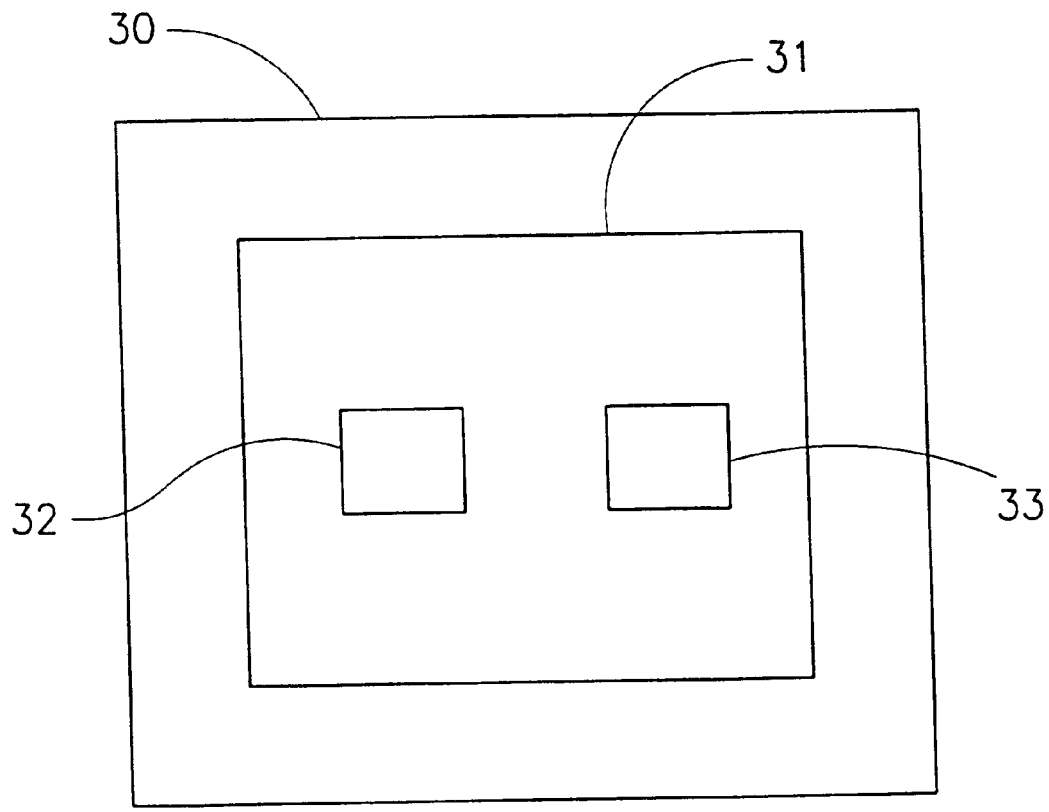
FIG. 3 illustrates a generalized block diagram of a system according to one embodiment of the invention.

Attention is now drawn to FIG. 3, illustrating a generalized block diagram, according to one embodiment of the invention. As shown, processor (30) is associated with a computer application (31) that includes a compactor module (32) and a counter set module (33) for carrying out the compaction and counter setting steps as described e.g. with reference to FIGS. 1 and 2. Those versed in the art will readily appreciate that the system of the invention is by no means bound by any specific realization of the processor (e.g. personal computer, network of computers etc.) and by the same token is not bound by any realization of the application, all as known per se.

It should be noted that the order of the following method steps is not necessarily prescribed by the numbers, alphabetic characters and roman symbols that are recited in the claims.

The present invention has been described with a certain degree of particularity, but those versed in the art will readily appreciate that various alterations and modifications may be carried out without departing from the scope and spirit of the following claims:

What is claimed is:

1. In a computer application having a counter for setting first and second counter values in respect of first and second objects respectively, said counter having a range of n possible values and being incremented or decremented in accordance with update criterion, said application taking an action according to a decision criterion that includes the stipulation that the first counter value is larger or equal to the second counter value;

a method for handling a counter overflow event whereby the counter is incremented beyond said range, the method comprising the steps of:

(i) compacting the first and second counter values to m values (m<n) so as to constitute first and second compacted counter values respectively; such that if the first counter value is larger than or equal to the second counter value then the compacted first value is not smaller than the compacted second value; and (ii) setting the counter to a value from among n−m values within said range, whereby substantially n−m counter values are released.

2. The method of claim 1, wherein said compacting step (i) includes dividing each one of said first and second counter values by k (k integer), and taking the ceiling integer of the division; said step (ii) includes setting said counter to a value from among said released values.

3. The method of claim 1, wherein said compacting step (i) includes setting the first and second values that are lower than t (t<n) to c (c constant), and subtracting t−1 from all first and second counter values that are larger or equal to said t; said step (ii) includes setting said counter to a value from among said released values.

4. The method according to claim 1, wherein said application being garbage collection of memory objects in an old area of a memory heap; said first objects being cards; said second objects being cars; said first counter values constituting card time stamp; said second counter values constituting car time stamp, and said action being updating remembered set associated with a car by scanning all cards having first counter values larger or equal to the second counter values of said cars.

5. A computer system comprising a processor and an application executed in said processor; the application having a counter for setting first and second counter values in respect of first and second objects, respectively, said counter having a range of n possible values and being incremented or decremented in accordance with update criterion, said application taking an action according to a decision criterion that includes the stipulation that the first counter value is larger or equal to the second counter value;

the processor is capable of handling a counter overflow event whereby the counter is incremented beyond said range; said processor includes:

(i) compactor, compacting the first and second counter values to m values (m<n) so as to constitute first and second compacted counter values respectively; such that if the first counter value is larger than or equal to the second counter value then the compacted first value is not smaller than the compacted second value; and (ii) counter setting unit, setting the counter to a value to a value from among n−m values within said range, whereby substantially n−m counter values are released.

6. The system of claim 5, wherein said compactor is capable of dividing each one of said first and second counter values by k (k integer), and taking the ceiling integer of the division; said counter set unit is capable of setting said counter to a value from among said released values.

7. The system of claim 5, wherein said compactor is capable of setting the first and second counter values that are lower than t (t<n) to c (c constant), and subtracting t−1 from all first and second counter values that are larger or equal to said t; said counter set unit is capable of setting said counter to a value from among said released values.

8. The system according to claim 5, wherein said application being garbage collection of memory objects in an old area of a memory heap; said first objects being cards; said second objects being cars; said first counter values constituting card time stamp; said second counter values constituting car time stamp, and said action being updating remembered set associated with a car by scanning all cards having first counter values larger or equal to the second counter values of said cars.

* * * * *